(12) United States Patent
Tello et al.

(10) Patent No.: US 12,078,204 B2
(45) Date of Patent: Sep. 3, 2024

(54) DEVICE AND METHOD FOR OPERATING A ROTARY VESSEL

(71) Applicant: Industrial Process Systems, Inc., Louisville, KY (US)

(72) Inventors: Luis J Tello, Louisville, KY (US); Michael J Atwell, Crestwood, KY (US)

(73) Assignee: Industrial Process Systems, Inc., Louisville, KY (US)

( * ) Notice: Subject to any disclaimer, the term of this patent is extended or adjusted under 35 U.S.C. 154(b) by 269 days.

(21) Appl. No.: 17/804,800

(22) Filed: May 31, 2022

(65) Prior Publication Data

US 2022/0397152 A1  Dec. 15, 2022

Related U.S. Application Data

(60) Provisional application No. 63/194,231, filed on May 28, 2021.

(51) Int. Cl.
| | | |
|---|---|---|
| *F16C 17/24* | (2006.01) | |
| *F16C 13/04* | (2006.01) | |
| *F16C 17/04* | (2006.01) | |
| *F26B 11/02* | (2006.01) | |
| *F27B 7/22* | (2006.01) | |
| *F27B 7/26* | (2006.01) | |

(Continued)

(52) U.S. Cl.
CPC ............ *F16C 17/243* (2013.01); *F16C 13/04* (2013.01); *F16C 17/04* (2013.01); *F16C 17/246* (2013.01); *F26B 11/022* (2013.01); *F27B 7/22* (2013.01); *F27B 7/2206* (2013.01); *F27B 7/42* (2013.01); *F27D 19/00* (2013.01); *F16C 2233/00* (2013.01); *F27B 2007/266* (2013.01); *F27D 2019/0025* (2013.01)

(58) Field of Classification Search
CPC ........ F16C 17/243; F16C 13/04; F16C 17/04; F16C 17/246; F16C 2233/00; F26B 11/022; F27B 7/22; F27B 7/2206; F27B 7/42; F27B 2007/266; F27D 19/00; F27D 2019/0025
See application file for complete search history.

(56) References Cited

U.S. PATENT DOCUMENTS

| | | | | |
|---|---|---|---|---|
| 3,572,859 A | * | 3/1971 | Sommer | ................... F27B 7/22 384/549 |
| 5,148,238 A | * | 9/1992 | Gebhart | .................. F27D 21/00 356/400 |

(Continued)

FOREIGN PATENT DOCUMENTS

| | | | | | |
|---|---|---|---|---|---|
| BR | 102015028474 B1 | * | 2/2022 | ............. | B64D 13/00 |
| DE | 102016218393 A1 | * | 3/2017 | ............ | F16C 19/364 |

OTHER PUBLICATIONS

BR-102015028474-B1, English Translation (Year: 2022).*

(Continued)

*Primary Examiner* — Ryan D Walsh
(74) *Attorney, Agent, or Firm* — Duncan Galloway; Greenwald PLLC; Kevin T. Duncan

(57) ABSTRACT

A method and a system for operating a rotary vessel, rotated by a tire riding on trunnions, which monitors the position of the tire relative to the upper and lower thrust bearings and the temperature of the upper and lower thrust bearings and provides an output that alerts an operator when corrective action should be taken.

28 Claims, 5 Drawing Sheets

(51) Int. Cl.
 *F27B 7/42* (2006.01)
 *F27D 19/00* (2006.01)

(56) References Cited

U.S. PATENT DOCUMENTS

| | | | | |
|---|---|---|---|---|
| 5,315,954 | A * | 5/1994 | Richmond | B65G 43/02 |
| | | | | 116/218 |
| 7,963,701 | B2 * | 6/2011 | Gebhart | F16C 13/04 |
| | | | | 384/488 |
| 8,201,313 | B1 * | 6/2012 | Girard | F27B 7/2206 |
| | | | | 29/407.09 |
| 9,022,659 | B2 * | 5/2015 | Pedersen | F03D 80/70 |
| | | | | 384/321 |
| 9,677,542 | B2 * | 6/2017 | Hawkins | H02K 7/1807 |
| 9,709,332 | B1 * | 7/2017 | Gebhart | F16C 13/04 |
| 2022/0163061 | A1 * | 5/2022 | Yano | F16C 17/243 |

OTHER PUBLICATIONS

DE-102016218393-A1, English Translation (Year: 2017).*
Rotary-kiln-maintenance-manual, Published Jun. 19, 2023 (Year: 2023).*

* cited by examiner

Fig 6A

| Drum Position | | |
|---|---|---|
| Downhill - 115°F | Centered | Uphill - 120°F |
| | | 15%<br>11 Hrs 5 Min<br>on Thrust Roller |

Fig 6B

| Drum Position | | |
|---|---|---|
| Downhill - 115°F | Centered | Uphill - 120°F |
| | | 80%<br>16 Hrs 34 Min<br>on Thrust Roller |

Fig 6C

| Drum Position | | |
|---|---|---|
| Downhill - 115°F | Centered | Uphill - 120°F |
| | | 100%<br>8 Hrs 23 Min<br>on Thrust Roller |

Fig 6D

| Drum Position | | |
|---|---|---|
| Downhill - 115°F | Centered | Uphill - 175°F |
| | | 100%<br>6 Hrs 54 Min<br>on Thrust Roller |

DEVICE AND METHOD FOR OPERATING A ROTARY VESSEL

CROSS-REFERENCE TO RELATED APPLICATION AND INCORPORATION BY REFERENCE

This application claims the benefit of priority to U.S. Provisional Application Ser. 63/194,231 filed May 28, 2021, which is incorporated by reference herein in the entirety.

BACKGROUND

The present invention relates to a device and method for operating a rotary vessel to help ensure that it is properly aligned to minimize energy consumption and wear.

A rotary vessel, such as a dryer, mixer, oast, etc., is a large, expensive piece of industrial equipment that, typically, has at least two tires (sometimes called live rings) which ride on trunnions (sometimes called support rollers) for rotation about a longitudinal axis. The rotary vessel has a longitudinal axis which is at a slight angle relative to horizontal, so that one end of the vessel is at a slightly higher elevation than the other end. Typically, material is input into the vessel near the higher elevation end, travels downstream along the interior of the vessel toward the lower elevation end, and is output near the lower elevation end. The material may be heated, mixed, or may receive other treatments as it is travelling along the interior of the vessel, with its travel along the interior of the vessel being aided by the rotation of the vessel and by gravity.

A set of upper and lower thrust bearings (or thrust rollers) is located adjacent to one of the tires, usually the one closest to the gear drive which causes the vessel to rotate, in order to keep the tires on the trunnions so that the tires do not fall off the trunnions. The upper thrust bearing is located a short distance upstream of the tire (in the direction of the higher elevation end), and the lower thrust bearing is located a short distance downstream of the tire (in the direction of the lower elevation end). The operator adjusts the trunnions so that the tires are rotating slightly off of an axis which is parallel to the axis of rotation of the vessel, causing the trunnions to be "crabbing" relative to the vessel. The trunnions are adjusted in very small increments to maintain the position of the rotary vessel within the tolerable margin of upstream and downstream movement between the thrust bearings. A delicate balance is needed in order to maintain the proper alignment (or rather the proper amount of slight misalignment) for the rotary vessel to operate properly.

The rotary vessel may move "uphill" (in the upstream direction) depending on a number of factors such as the weight of the load (more weight causes more friction between the tires and the trunnions so the rotary vessel moves upwardly). If the operators want the vessel to move "uphill", they may increase friction by adding sand to the contact surface area. If the operators want the vessel to move "downhill", they may reduce friction by adding grease to the contact surface area. However, those changes in the amount of friction are relatively short-lived. It is preferable to carefully adjust the degree of offset of the trunnions relative to the rotary vessel to keep the tire in proper alignment relative to the thrust bearings.

It is generally desirable to have the rotary vessel operating in the "neutral" zone (or slop range) which is typically about ½ inch on each side of the tire between the lower and upper thrust bearings; that is, the tire is neither hitting against the upper thrust bearing nor is it bumping against the lower thrust bearing. In reality, the alignment of the trunnions preferably is set so that the tire bumps against one of the thrust bearings every now and then but does not stay there too long nor does it put too much force on the respective thrust bearing. To achieve this, the degree of "misalignment" of the trunnions relative to the rotary vessel is increased if it is desired for the rotary vessel to move upwardly (away from the lower thrust bearing and up toward the upper thrust bearing) and is decreased if it is desired for the rotary vessel to move downwardly. Only a small amount of misalignment should be required, and the misalignment of all the trunnions on the rotary vessel should be the same so that one set of trunnions is not fighting another set of trunnions. The amount of misalignment usually is adjusted in very small (about 0.005 inch) increments.

If two or more sets of trunnions are misaligned relative to each other, the amperage draw on the rotator drive that causes the rotary vessel to rotate will increase a large amount, and it will cause the trunnions and/or tires to wear, which expedites failure of the trunnions and/or tires. The replacement of one or more of the tires is a time consuming and expensive task which requires cutting the rotary vessel in half to remove the failed tire and to install a replacement tire, and then re-welding the rotary vessel back together.

If the trunnions are not properly aligned, the tire may exert undue force on one or both of the thrust bearings, which may cause undue wear on the tire and/or undue wear on the thrust bearings. It is expensive and time-consuming to replace the thrust bearings.

In addition, if proper alignment is not maintained, it is possible for the tires to fall off of the trunnions, resulting in total failure, which again is very undesirable.

SUMMARY

The purpose of the present invention is to help the operator maintain the rotary vessel in proper alignment to reduce wear and maintenance problems and to conserve energy.

One embodiment of the present invention monitors the rotation of the thrust bearings and the rotation of the rotary drum as well as the temperatures of the thrust bearings. As long as the rotary vessel is riding in the neutral zone between the thrust bearings, the thrust bearings will not be rotating. When the rotary vessel impacts against one or the other of the thrust bearings, the respective thrust bearing will start to rotate. By monitoring the rotation of the thrust bearings, it can be determined how long the rotary vessel has been riding against the respective thrust bearing. Depending on the application and on the operating parameters of the facility, the duration of impact of the tire against the respective thrust bearing may be relatively short or it may be prolonged. As long as there is a reasonable explanation for the duration of the impact, it may not be a matter of concern. For instance, if a long impact-duration is detected but it is established that it was due to an unusually heavy load and that this is not likely to be a standard operating procedure, then the condition may be excused. On the other hand, if there is not a reasonable explanation, it may be determined that there is a problem that needs to be corrected before excessive wear occurs.

The rate of rotation of the thrust bearings also may be compared to the rate of rotation of the rotary drum to help determine the extent of contact between the tire and the thrust bearing.

If one of the thrust bearings in the pair is rotating, its temperature is likely to rise relative to the temperature of the other thrust bearing in the pair. The temperatures of the upper and lower thrust bearings are monitored, and those temperatures are compared to each other. If a thrust bearing has been rotating (indicating contact of the tire against that thrust bearing), and if the temperature of that thrust bearing rises significantly relative to that of the other thrust bearing in the pair, then that may indicate a problem that needs to be addressed. A sharp temperature rise may indicate that the rotary vessel is placing an inordinate load on one of the thrust bearings, and that condition should be addressed.

The operating parameters described above are monitored, and algorithms are applied to the data to determine when the operator should give attention to the unit and the degree of urgency with which attention is required. User-friendly outputs are generated to communicate that information to the operator.

In a first embodiment, the present invention provides a method for operating a rotary vessel having a tire riding on trunnions and including upper and lower thrust bearings adjacent to the tire. The method comprises the steps of: providing sensors to monitor the temperatures of the upper and lower thrust bearings; comparing sensed temperatures of the upper and lower thrust bearings; and providing an output to an operator to indicate when the difference between those temperatures exceeds a desired amount.

The first embodiment may be further characterized by one or more of the following: providing at least one sensor to monitor the position of the tire relative to the upper and lower thrust bearings and providing an output signal representing an indication of need for corrective action; providing rotation monitoring devices adapted to measure the rate of rotation of the upper and lower thrust bearings and to generate an output to an operator representing measured values; wherein the rotation monitoring devices are non-contact type tachometers; providing a vessel tachometer to monitor the rate of rotation of the rotary vessel; monitoring the power draw of the rotary drive that drives the rotation of the rotary vessel and detecting if the power draw increases substantially; providing a local processing unit disposed proximate the rotary vessel and in electrical communication with one or more sensors or monitors to receive signals representing a set of performance data comprising one or more of: the revolutions of the upper and lower thrust bearings, rotation of the rotary vessel, power draw of the rotary drive, the position of the time relative to the thrust bearings, and/or temperatures of the thrust bearings; transmitting the performance data via electrical communication to a remote operator observation station configured to receive, process and present information to an operator monitoring performance associated with the rotary vessel; providing a local processing unit located remotely from the rotary vessel and adapted to receive via wireless communication signals from one or more sensors or monitors disposed proximate to the rotary vessel, the signals representing a set of performance data comprising one or more of: the revolutions of the upper and lower thrust bearings, rotation of the rotary vessel, power draw of the rotary drive, the position of the time relative to the thrust bearings, and/or temperatures of the thrust bearings; determining a position of the tire based on the monitored rotation and temperature of the thrust bearings and whether the tire is riding in or out of a predetermined neutral zone; comparing rate of rotation of the thrust bearings with rate of rotation of the vessel; determining if the temperature of one thrust bearing rises significantly relative to the temperature of the other thrust bearing and, based on a determined temperature rise, presenting an indication that the rotary vessel may be placing an inordinate load on the one thrust bearing; providing a distance sensor adapted to continuously monitor the location of the tire relative to the thrust bearings; and/or wherein the distance sensor is a radio frequency echo sensor.

In a second embodiment the present invention provides a system for operating a rotary vessel having a tire riding on trunnions, and including upper and lower thrust bearings adjacent to the tire. The system comprises: a set of sensors configured to monitor the temperatures of the upper and lower thrust bearings; and a local processing unit in electrical communication with the set of temperature sensors to receive signals representing a set of performance data, the local processing unit comprising a processor and a memory, the memory adapted to store a set of instructions for execution by the processor, the set of instructions including instructions, when executed by the processor, adapted to compare sensed temperatures of the upper and lower thrust bearings; wherein the local processing unit is further adapted to generate and transmit a signal indicating when the difference between the sensed temperatures exceeds a desired amount.

The system of the second embodiment may by further characterized in one or more of the following ways: at least one sensor adapted to monitor the position of the tire relative to the upper and lower thrust bearings and provide an output signal representing an indication of need for corrective action; a set of rotation monitoring devices adapted to measure the rate of rotation of the upper and lower thrust bearings and generate an output representing measured values; wherein the rotation monitoring devices are non-contact type tachometers; a vessel tachometer to monitor the rate of rotation of the rotary vessel; a monitor adapted to detect the power draw of the rotary drive that drives the rotation of the rotary vessel and detect if the power draw increases substantially; wherein the local processing unit is disposed proximate the rotary vessel and is in electrical communication with one or more sensors or monitors to receive signals representing a set of performance data comprising one or more of: the revolutions of the upper and lower thrust bearings, rotation of the rotary vessel, power draw of the rotary drive, the position of the time relative to the thrust bearings, and/or temperatures of the thrust bearings; wherein the local processing unit is adapted to transmit the performance data via electrical communication to a remote operator observation station configured to receive, process and present information to an operator monitoring performance associated with the rotary vessel; wherein the local processing unit is located remotely from the rotary vessel and adapted to receive via wireless communication signals from one or more sensors or monitors disposed proximate to the rotary vessel, the signals representing a set of performance data comprising one or more of: the revolutions of the upper and lower thrust bearings, rotation of the rotary vessel, power draw of the rotary drive, the position of the time relative to the thrust bearings, and/or temperatures of the thrust bearings; wherein the local processing unit includes instructions configured to determine a position of the tire based on the monitored rotation and temperature of the thrust bearings and determine whether the tire is riding in or out of a predetermined neutral zone; wherein the local processing unit includes instructions configured to compare rate of rotation of the thrust bearings with rate of rotation of the vessel; wherein the local processing unit includes instructions configured to determine if the temperature of one thrust bearing rises significantly relative to the temperature of the other thrust bearing and, based on a determined temperature rise, present an indication that the rotary vessel may be placing an inordinate load on the one thrust bearing; a distance sensor adapted to continuously monitor the location of the tire relative to the thrust bearings; and/or wherein the distance sensor is a radio frequency echo sensor.

BRIEF DESCRIPTION OF THE DRAWINGS

FIGS. 6A-6D show examples of images on a monitor to visually show the operator the operating conditions of the rotating vessel for one embodiment of the present invention.

DESCRIPTION

Figure 1:
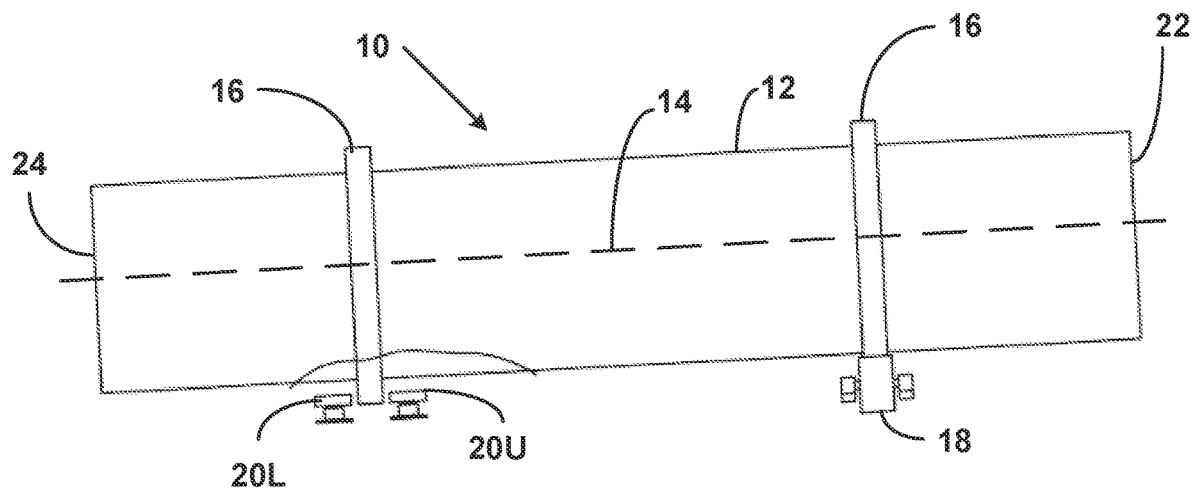
FIG. 1 is a side view of a two-tire rotary vessel, with the lower trunnions omitted so that the thrust bearings adjacent to the lower tire may be seen clearly.
Figure 2:
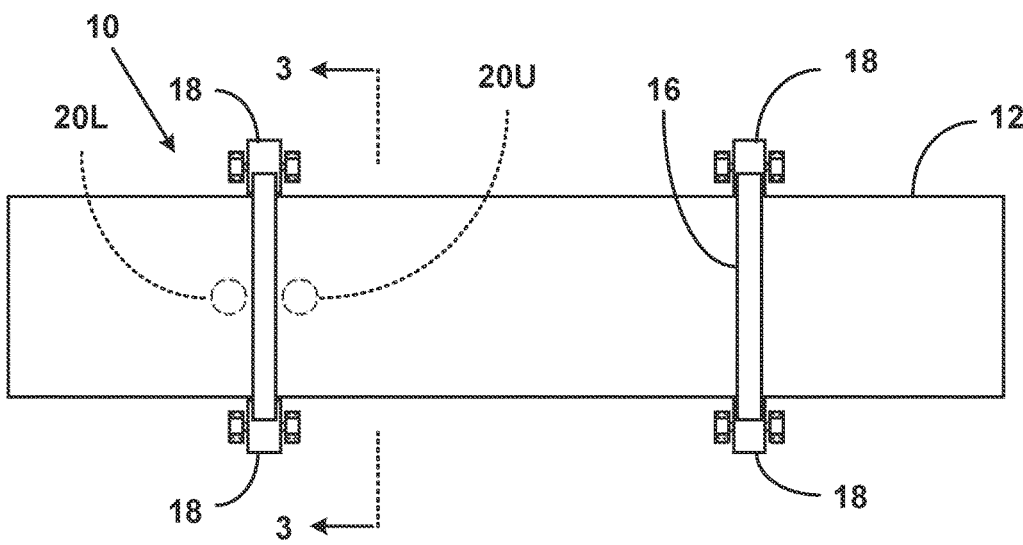
FIG. 2 is a plan view of the rotary vessel of FIG. 1, with the set of thrust bearings shown in phantom.
Figure 3:
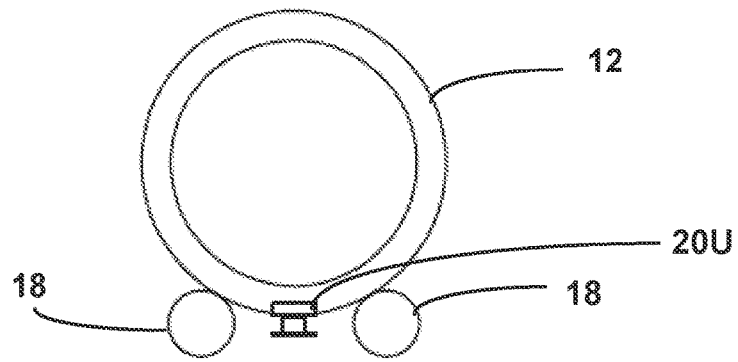
FIG. 3 is a view along line 3-3 of FIG. 2.

FIGS. 1-3 depict a typical piece of rotary equipment 10 (such as, for example, a kiln, a dryer, or an oast), to which the present monitoring and control arrangement has been added. The equipment includes a substantially cylindrical vessel 12 defining a longitudinal axis of rotation 14. The axis of rotation 14 is at a slight angle relative to the horizontal, so that the first end (upstream end) 22 of the vessel 12 is at a higher elevation than the second end (downstream end) 24 of the vessel 12, which facilitates and promotes the movement of material inside the vessel 12 from the higher elevation at the first end 22 toward the lower elevation at the second end 24, or from the upstream end 22 toward the downstream end 24.

Two tires 16 are mounted on the vessel 12. (Some larger vessels will have additional tires 16.) The tires 16 ride on and are supported for rotation about the axis 14 by sets of trunnions 18, as is known in the industry. FIG. 1 shows only the first set of trunnions 18 on the upstream tire 16 at the higher elevation. The second set of trunnions 18 on the other (downstream) tire 16 is omitted for clarity.

To prevent the tires 16 from falling off their respective trunnions 18, a set of thrust bearings 20 is installed, bracketing one of the tires 16. Typically, just one set of thrust bearings 20 is installed, and this set is typically located on the tire 16 which is closest to the drive (not shown). FIG. 1 shows the upper thrust bearing 20U on the upstream side of the tire 16 and the lower thrust bearing 20L on the downstream side of the tire 16. As indicated above, the gap between each of the thrust bearings 20 and the respective adjacent side of the tire 16 is typically on the order of ½ inch. Even though there may be some "runout" of the tire during its rotation, thus varying the size of this gap, this runout typically is relatively small.

Figure 4:
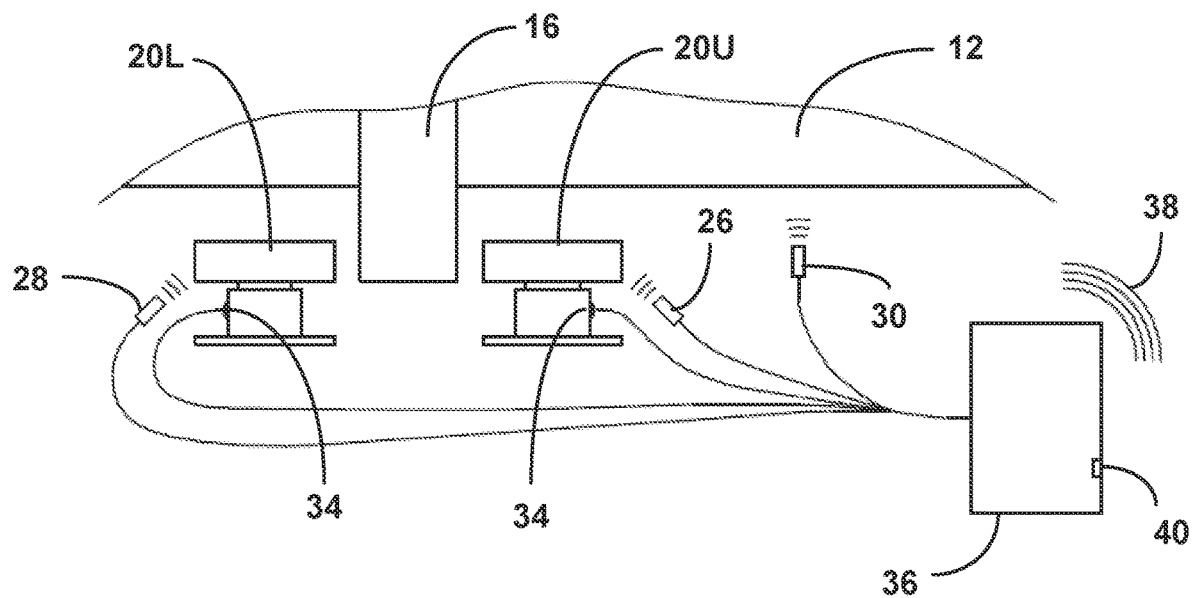
FIG. 4 is a broken-away, side view of the lower portion of the lower tire and thrust bearings of FIG. 1, showing some of the hardware for monitoring the system.

Referring now to FIG. 4, the broken-away side view of the vessel 12 shows a set of sensors or monitors for monitoring the operation of the vessel 12. As was explained earlier, the downstream tire 16 is bracketed by the upper thrust bearing 20U and the lower thrust bearing 20L. Upper and lower tachometers (or rate of rotation monitors) 26, 28, respectively, are mounted so as to monitor the rate of rotation (such as the revolutions per minute RPM) of each of their respective thrust bearings 20U, 20L. In one embodiment, these tachometers 26, 28 are non-contact or non-touch photo tachometers which detect the repeated appearance of a reflective surface on the respective thrust bearing 20 as the bearing rotates, which is translated into the rate of rotation of the respective thrust bearing 20U, 20L. The photo tachometer may use a laser, infrared light or other light source to take measurements, from a distance, representing or relating to the rotation of the respective thrust bearings. Other types of tachometers (or rate of rotation monitors) may be used, such as magnetic tachometers, proximity switch tachometers, and others, as is well known in the industry. A vessel tachometer 30, which may be identical to the tachometers 26, 28, is mounted so as to monitor the rate of rotation of the vessel 12. A temperature monitor 34 (which may be a thermocouple or other type of temperature monitor well known in the industry) is installed on each of the thrust bearings 20U, 20L to monitor the temperature of its respective thrust bearing 20U, 20L.

The power draw of the rotary drive that drives the rotation of the vessel also is monitored. (not shown)

These monitors 26, 28, 30, and 34 are hard wired to, or otherwise in electrical communication with (e.g., wireless or combination of wired and wireless devices and intermediate components), a local processing unit 36 (also referred to as a local computer board) which is mounted in the vicinity of the vessel 12 and which counts and records the revolutions of the thrust bearings 20 and of the vessel 12, as well as the temperatures of the thrust bearings 20. This information may then be forwarded, either by a hard wired connection (not shown) or via a Wi-Fi or other radio-transmitted signal 38 to a remote location where a processor with software analyzes and interprets the data and displays it in a meaningful manner (preferably a display within the existing monitor in the operator's room) for the operator to see and understand so that appropriate action may be taken, as is explained in more detail later. Optionally, a cellular unit (not shown) may be plugged into the local computer board 36, using an Ethernet port 40, for instance, to download the data and send it to a remote cloud server, where it may be retrieved remotely by the user and/or by qualified contractor personnel to help troubleshoot the facility. Of course, alternatively, the local processing unit 36 may instead be installed remotely, and the relevant data may be sent wirelessly from the monitors 26, 28, 30, 34 to the local processing unit 36. Also, the information collected by the local processing unit 36 need not be sent wirelessly to be retrieved by a processor to analyze the data and/or to display it on a monitor. The information may be collected via the Ethernet port 40 onto a portable hard drive (not shown), such as a thumb drive or a flash drive, and may be physically carried to the location where it is analyzed and/or displayed on a monitor.

In this embodiment, the position of the tire 16 is monitored by monitoring the rotation and temperature of the thrust bearings 20. As long as the tire 16 of the vessel 12 is riding in the neutral zone (where it is not contacting either of the thrust bearings 20), the thrust bearings 20 will not be rotating. When the rotary vessel impacts against one or the other of the thrust bearings 20U, 20L, the respective thrust bearing will start to rotate, and that rotation will be sensed by the respective monitor 26, 28 and will be transmitted to the processing unit 36. By monitoring this rotation, the processing unit 36 will determine how long the tire 16 of the rotary vessel 12 has been riding against the respective thrust bearing 20U or 20L. Depending on the application and on the operating parameters of the facility, the duration of impact of the tire 16 of the rotary vessel 12 against the respective thrust bearing 20U or 20L may be relatively short or it may be prolonged.

The processor also compares the rate of rotation of the thrust bearings 20 with the rate of rotation of the vessel 12.

As has been indicated earlier, if one of the thrust bearings 20 is rotating, its temperature is likely to rise relative to the temperature of the other thrust bearing 20. The temperature of the thrust bearings 20 is monitored by the temperature sensors 34, and the processor compares these temperatures to each other (this eliminates any concern over a temperature rise of a thrust bearing 20 due to a rise in the ambient temperature as opposed to a temperature rise due to an operating condition, such as an overloading of the thrust bearing 20). If a thrust bearing 20 has been rotating (indicating contact of the tire 16 against that thrust bearing 20) and if the temperature of that thrust bearing 20 rises significantly relative to that of the other thrust bearing 20, then the algorithm used by the processor may cause the processor to produce an output indicating that there is a problem that needs to be addressed. The temperature rise is an indication that the rotary vessel 12 is likely placing an inordinate load on the thrust bearing 20.

The power draw is continually provided to the operator on a monitor (not shown). If the power draw increases substantially, this indicates to the operator that adjustment or other attention is needed.

FIGS. 6A-6D show examples of four different conditions which may occur and which the processor may cause to be displayed on a monitor, such as the operator's monitor in the main control room. FIG. 6A indicates that the upper thrust bearing 20U is in contact with the tire 16 an average of 15% of the time. That is, the tire 16 is bumping up against the upper thrust bearing 20U approximately 15% of the time that the vessel 12 is rotating. It also indicates that the upper thrust bearing 20U has been in contact with the tire 16 for a total of 11 hours and 5 minutes since it was last zeroed out. Finally, it also reads the temperatures of both the upper thrust bearing 20U (120 F) and of the lower thrust bearing 20L (115 F). The cell which is BOLD may be colored green to indicate that there is no problem at this time.

It should be noted that the reset function of the system can be programmed as desired. For instance, the average time duration that the tire 16 has been impacting against the thrust bearing 20 may be automatically set to be calculated for every rotation of the vessel 12, or for a period of time of 5 minutes, or every 30 minutes, or every hour, or every shift, or every 24 hours, or any other preference, or it may be reset manually at any time.

Experience with operating the unit and with using the outputs may suggest that modifications should be made to the algorithms in order to generate outputs that are more useful to the operator.

FIG. 6B indicates that the upper thrust bearing 20U has been in contact with the tire 16 an average of 80% of the time and it has been in contact with the tire 16 a total of 16 hours and 34 minutes since it was last zeroed out. The temperature of the upper thrust bearing 20U remains at 120 F so there is no immediate concern about overloading the upper thrust bearing 20U despite the relatively high contact time of the tire 16 against the upper thrust bearing 20U. The cell which is BOLD may be colored green to indicate that there is no problem at this time.

FIG. 6C indicates that the upper thrust bearing 20U has been in contact with the tire 16 an average of 100% of the time and it has been in contact with the tire 16 a total of 8 hours and 23 minutes since it was last zeroed out. The temperature of the upper thrust bearing 20U remains at 120 F, so there is no immediate concern about overloading the upper thrust bearing 20U despite the high contact time of the tire 16 against the upper thrust bearing 20U. This condition should be monitored closely to ensure that it does not deteriorate into an overload condition of the upper thrust bearing 20U. The cell which is BOLD may be colored yellow to indicate that, even though there is no problem at this time, the operator should keep an eye on the situation to ensure it does not deteriorate.

It should be noted that the set point for the percent of time that the thrust bearing 20 is rotating relative to the vessel 12 also can be set to an operator preference. For instance, control for the display on FIG. 6C may be programmed to change from green to yellow when the average time is 90% instead of 100%.

FIG. 6D indicates that the upper thrust bearing 20U has been in contact with the tire 16 an average of 100% of the time and it has been in contact with the tire 16 a total of 6 hours and 54 minutes since it was last zeroed out. The temperature of the upper thrust bearing 20U has now risen to 175 F, and this is considerably higher than the temperature of the lower thrust bearing 20L of 115 F. This would indicate an abnormal operating condition for the rotary vessel 10, and corrective action should be taken to prevent damage to the upper thrust bearing 20U. The cell which is BOLD may be colored red to indicate that there is a problem at this time which needs to be addressed. Algorithms may be programmed into the controller for the display to change the color of the display or to sound an alarm, make a phone call, or generate other outputs, depending upon the sensed operating conditions.

Figure 5:
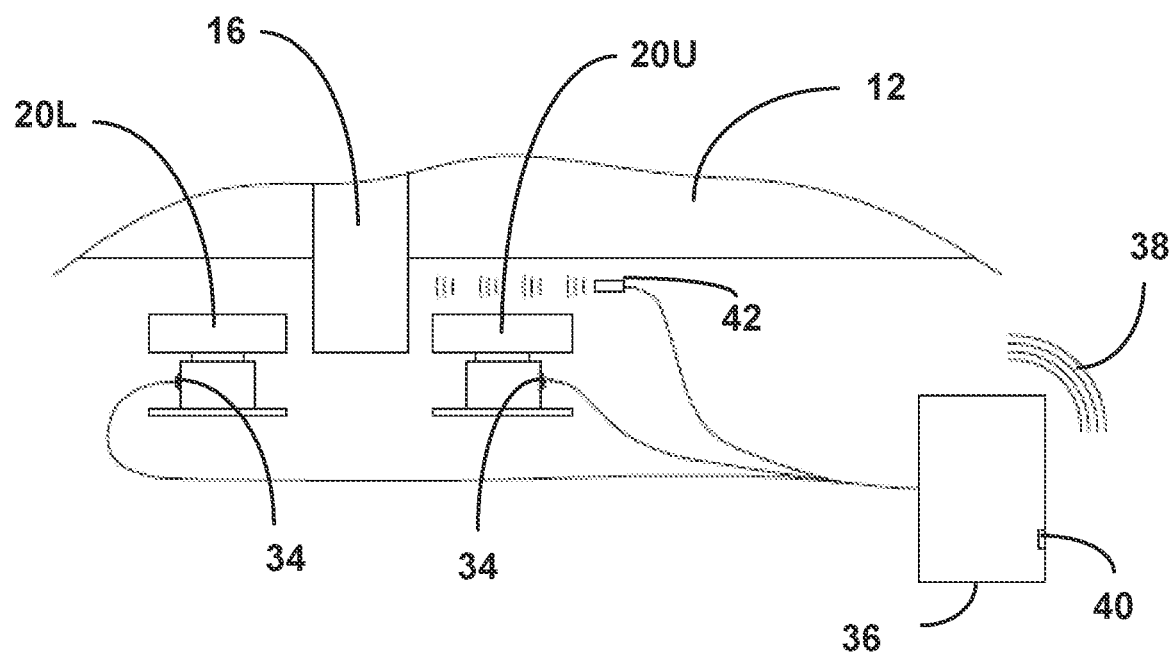
FIG. 5 is a view similar to FIG. 4 but showing alternative hardware for monitoring the system.

Referring now to FIG. 5, this broken-away, side view of the vessel 12 shows the components of another embodiment of the present invention which is similar to that shown in FIG. 4. As was explained earlier, the tire 16 is bracketed by the upper thrust bearing 20U and the lower thrust bearing 20L. In this embodiment, the upper and lower tachometers 26, 28 for the thrust bearings 20U, 20L and the vessel tachometer 30 of FIG. 4 are not present, and instead a distance sensor 42 (such as a radio frequency echo sensor) continuously monitors the location of the tire 16 relative to the thrust bearings 20 (not just when the tire 16 impacts against one or the other of the thrust bearings 20U, 20L) and transmits that information to the processor 36, which may, in turn, transmit data to a remote location. The temperature monitors 34 remain in this embodiment. Of course, all of the aforementioned monitors 26, 28, 30, 34, and 42 may be used together in a single embodiment, if desired.

This embodiment of FIG. 5 may be useful for applications such as in asphalt plants and others, where the operation is cyclical, not nearly as continuous as that of process systems, and where there is considerably more movement of the vessel 12 relative to the thrust bearings 20. Not only is the location of the tire 16 relative to the thrust bearings 20 important, but also the trending aspect of the movement of the tire 16 relative to the thrust bearings 20 is important. The distance sensor 42 provides this sort of "relative position" information of the tire 16 relative to the thrust bearings 20, rather than just indicating when the tire 16 makes contact with one or the other of the thrust bearings 20, as is the case in the first embodiment described above.

Other than the absence of the rate of rotation sensors (tachometers) 26, 28, 30 and the presence of the distance sensor 42, these two embodiments are substantially the same, although the data collected, how it is presented, and the algorithms used to determine when the unit needs attention may be different, as explained in more detail below.

Figure 7:
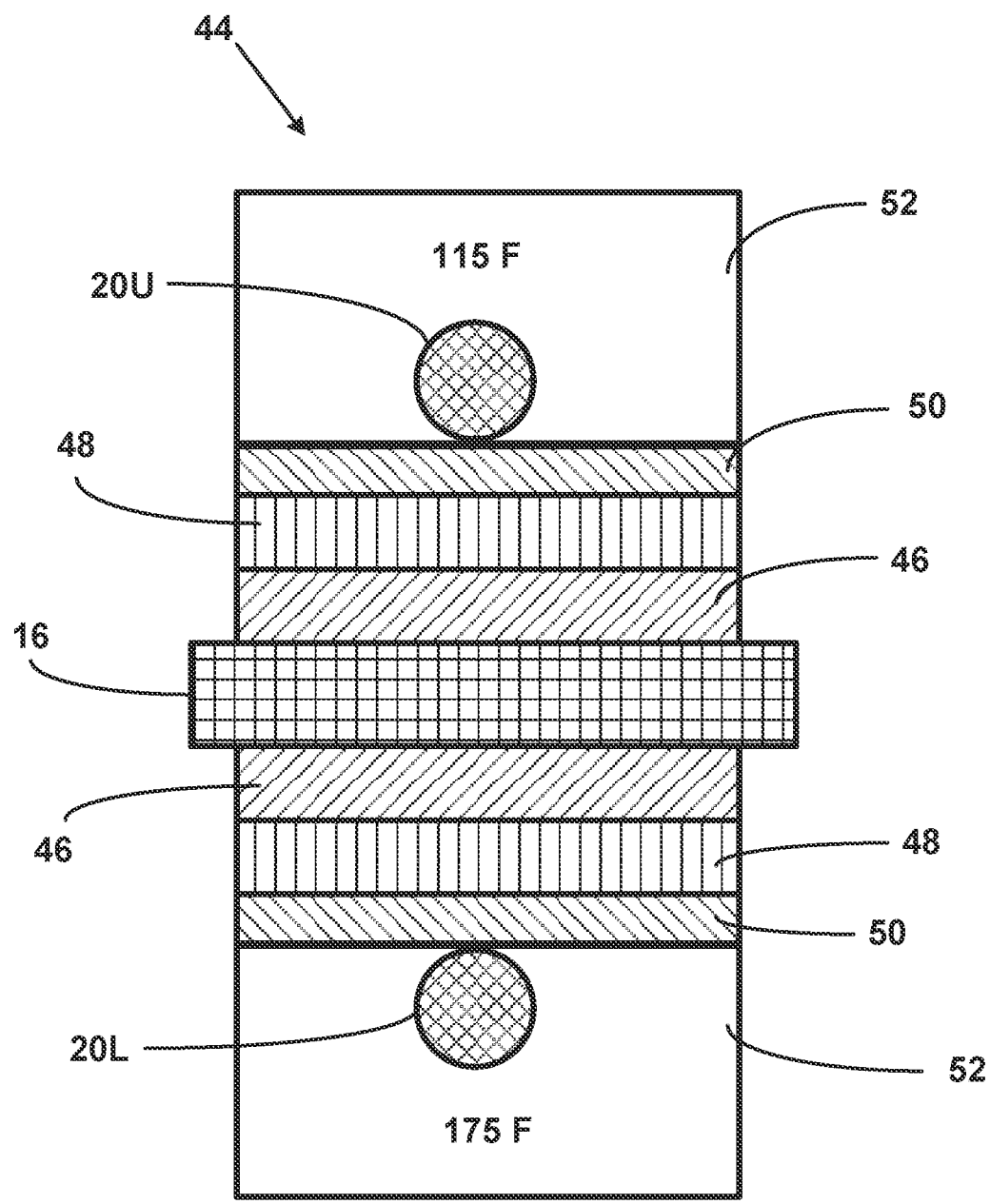
FIG. 7 shows an example of an image on a monitor to visually show the operator the operating conditions of the rotating vessel for another embodiment of the present invention.

FIG. 7 shows an example of what the display may look like on a monitor, such as the operator's monitor in the main control room. The graphic 44 represents the actual arrangement on the field, including the thrust bearings 20U, 20L, the tire 16, and different zones (not to scale) of the position of the tire 16 relative to the thrust bearings 20.

A first zone 46 is a safe or normal zone. This zone 46 may for example be colored a dark green, and it is a zone wherein there is no contact between the tire 16 and the thrust bearings 20.

A second zone 48 is still a relatively safe zone. This zone 48 may be colored a light green and it is a zone 48 wherein contact between the tire 16 and one the thrust bearings 20U, 20L is imminent.

A third zone 50 is a contact zone. This zone 50 may be colored yellow, and it is a zone 50 wherein there is contact between the tire 16 and one of the thrust bearings 20U, 20L, but wherein an elevated temperature of the corresponding thrust bearing 20 has not yet been detected. The operator may continue to operate but should keep a close watch on this condition to ensure it does not deteriorate.

A fourth zone 52 is a contact-and-high-temperature zone 52. This zone 52 may be colored red, and it is a zone 52 wherein there is contact between the tire 16 and one of the thrust bearings 20U, 20L, and wherein an elevated temperature of the corresponding thrust bearing 20 has been detected. The operator should take immediate action to remedy this condition before it deteriorates any further.

As shown in FIG. 7, the temperature of the corresponding thrust bearing 20U, 20L may be displayed in this red zone 52. In this instance, the lower thrust bearing 20L is showing an elevated temperature of 175 F and it is likely that the tire 16 is impacting against the lower thrust bearing 20L. Therefore, all the cells above the tire 16 would remain clear (not colored) and all the cells below the tire 16 would also remain clear except for the cell 52 surrounding the lower thrust bearing 20L which would be lit in red indicating that the tire 16 is impacting against the lower thrust bearing 20L and that there is a high temperature condition which needs to be addressed.

Of course, the color scheme may be changed as desired. For instance, zone 52 may start flashing red when the temperature of the corresponding thrust bearing 20 starts to rise above a given set point and then glow a steady red when the temperature has risen above a higher set point. These set points may be constant values or they may be pegged to a temperature difference between the thrust bearings 20, or some alternative algorithm may be used. For example, the first set point may be set at a temperature difference of 35 F between the thrust bearings 20, and the second set point may be set at a temperature difference of 70 F between the thrust bearings 20.

While the embodiments described above show some arrangements for monitoring the operating conditions of the vessel 12 and providing outputs to indicate to the operator when corrective attention is needed, it will be obvious to those skilled in the art that modifications could be made to these arrangements without departing from the scope of the present invention as claimed.

What is claimed is:

1. A method for operating a rotary vessel having a tire riding on trunnions, and including upper and lower thrust bearings adjacent to the tire, comprising the steps of:

providing sensors to monitor the temperatures of the upper and lower thrust bearings;
comparing sensed temperatures of the upper and lower thrust bearings; and
providing an output to an operator to indicate when the difference between those temperatures exceeds a desired amount.

2. The method of claim 1 further comprising: providing at least one sensor to monitor the position of the tire relative to the upper and lower thrust bearings and providing an output signal representing an indication of need for corrective action.

3. The method of claim 1 further comprising: providing rotation monitoring devices adapted to measure the rate of rotation of the upper and lower thrust bearings and to generate an output to an operator representing measured values.

4. The method of claim 3 wherein the rotation monitoring devices are non-contact type tachometers.

5. The method of claim 1 further comprising: providing a vessel tachometer to monitor the rate of rotation of the rotary vessel.

6. The method of claim 1 further comprising: monitoring the power draw of the rotary drive that drives the rotation of the rotary vessel and detecting if the power draw increases substantially.

7. The method of claim 1 further comprising: providing a local processing unit disposed proximate the rotary vessel and in electrical communication with one or more sensors or monitors to receive signals representing a set of performance data comprising one or more of: the revolutions of the upper and lower thrust bearings, rotation of the rotary vessel, power draw of the rotary drive, the position of the time relative to the thrust bearings, and/or temperatures of the thrust bearings.

8. The method of claim 7 further comprising: transmitting the performance data via electrical communication to a remote operator observation station configured to receive, process and present information to an operator monitoring performance associated with the rotary vessel.

9. The method of claim 1 further comprising: providing a local processing unit located remotely from the rotary vessel and adapted to receive via wireless communication signals from one or more sensors or monitors disposed proximate to the rotary vessel, the signals representing a set of performance data comprising one or more of: the revolutions of the upper and lower thrust bearings, rotation of the rotary vessel, power draw of the rotary drive, the position of the time relative to the thrust bearings, and/or temperatures of the thrust bearings.

10. The method of claim 1 further comprising: determining a position of the tire based on a monitored rotation and temperature of the thrust bearings and whether the tire is riding in or out of a predetermined neutral zone.

11. The method of claim 1 further comprising: comparing rate of rotation of the thrust bearings with rate of rotation of the vessel.

12. The method of claim 1 further comprising: determining if the temperature of one thrust bearing rises significantly relative to the temperature of the other thrust bearing and, based on a determined temperature rise, presenting an indication that the rotary vessel may be placing an inordinate load on the one thrust bearing.

13. The method of claim 1 further comprising: providing a distance sensor adapted to continuously monitor the location of the tire relative to the thrust bearings.

14. The method of claim 13 wherein the distance sensor is a radio frequency echo sensor.

15. A system for operating a rotary vessel having a tire riding on trunnions, and including upper and lower thrust bearings adjacent to the tire, the system comprising:
- a set of sensors configured to monitor the temperatures of the upper and lower thrust bearings; and
- a local processing unit in electrical communication with the set of temperature sensors to receive signals representing a set of performance data, the local processing unit comprising a processor and a memory, the memory adapted to store a set of instructions for execution by the processor, the set of instructions including instructions, when executed by the processor, adapted to compare sensed temperatures of the upper and lower thrust bearings;
- wherein the local processing unit is further adapted to generate and transmit a signal indicating when the difference between the sensed temperatures exceeds a desired amount.

16. The system of claim 15 further comprising: at least one sensor adapted to monitor the position of the tire relative to the upper and lower thrust bearings and provide an output signal representing an indication of need for corrective action.

17. The system of claim 15 further comprising: a set of rotation monitoring devices adapted to measure the rate of rotation of the upper and lower thrust bearings and generate an output representing measured values.

18. The system of claim 17 wherein the rotation monitoring devices are non-contact type tachometers.

19. The system of claim 15 further comprising: a vessel tachometer to monitor the rate of rotation of the rotary vessel.

20. The system of claim 15 further comprising: a monitor adapted to detect the power draw of the rotary drive that drives the rotation of the rotary vessel and detect if the power draw increases substantially.

21. The system of claim 15 further wherein the local processing unit is disposed proximate the rotary vessel and is in electrical communication with one or more sensors or monitors to receive signals representing a set of performance data comprising one or more of: the revolutions of the upper and lower thrust bearings, rotation of the rotary vessel, power draw of the rotary drive, the position of the time relative to the thrust bearings, and/or temperatures of the thrust bearings.

22. The system of claim 21 further wherein the local processing unit is adapted to transmit the performance data via electrical communication to a remote operator observation station configured to receive, process and present information to an operator monitoring performance associated with the rotary vessel.

23. The system of claim 15 further wherein the local processing unit is located remotely from the rotary vessel and adapted to receive via wireless communication signals from one or more sensors or monitors disposed proximate to the rotary vessel, the signals representing a set of performance data comprising one or more of: the revolutions of the upper and lower thrust bearings, rotation of the rotary vessel, power draw of the rotary drive, the position of the time relative to the thrust bearings, and/or temperatures of the thrust bearings.

24. The system of claim 15 further wherein the local processing unit includes instructions configured to determine a position of the tire based on the monitored rotation and temperature of the thrust bearings and determine whether the tire is riding in or out of a predetermined neutral zone.

25. The system of claim 15 further wherein the local processing unit includes instructions configured to compare rate of rotation of the thrust bearings with rate of rotation of the vessel.

26. The system of claim 15 further wherein the local processing unit includes instructions configured to determine if the temperature of one thrust bearing rises significantly relative to the temperature of the other thrust bearing and, based on a determined temperature rise, present an indication that the rotary vessel may be placing an inordinate load on the one thrust bearing.

27. The system of claim 15 further comprising a distance sensor adapted to continuously monitor the location of the tire relative to the thrust bearings.

28. The system of claim 27 wherein the distance sensor is a radio frequency echo sensor.

* * * * *